(12) United States Patent
ReMine et al.

(10) Patent No.: US 11,092,966 B2
(45) Date of Patent: Aug. 17, 2021

(54) BUILDING AN ARTIFICIAL-INTELLIGENCE SYSTEM FOR AN AUTONOMOUS VEHICLE

(71) Applicant: The Boeing Company, Chicago, IL (US)

(72) Inventors: Daniel ReMine, Madison, AL (US); Tyler Charles Staudinger, Huntsville, AL (US); Joshua David Kalin, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 314 days.

(21) Appl. No.: 16/220,349

(22) Filed: Dec. 14, 2018

(65) Prior Publication Data

US 2020/0192389 A1 Jun. 18, 2020

(51) Int. Cl.
*G05D 1/02* (2020.01)
*G06K 9/00* (2006.01)
*G06N 3/04* (2006.01)
*G06N 3/08* (2006.01)
*G06K 9/62* (2006.01)

(52) U.S. Cl.
CPC ......... *G05D 1/0221* (2013.01); *G05D 1/0246* (2013.01); *G06K 9/00805* (2013.01); *G06K 9/6259* (2013.01); *G06N 3/0454* (2013.01); *G06N 3/088* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 9,600,936 B2 * | 3/2017 | Boivin | H04N 13/275 |
| 9,767,565 B2 * | 9/2017 | Estrada | G06K 9/6267 |
| 2019/0080206 A1 * | 3/2019 | Hotson | G06K 9/00798 |

(Continued)

OTHER PUBLICATIONS

Zhang, Mengshi, et al. "DeepRoad: GAN-based metamorphic testing and input validation framework for autonomous driving systems." 2018 33rd IEEE/ACM International Conference on Automated Software Engineering (ASE). IEEE, 2018. (Year: 2018).*

(Continued)

*Primary Examiner* — Alan D Hutchinson
(74) *Attorney, Agent, or Firm* — Womble Bond Dickinson LLP

(57) ABSTRACT

An apparatus for building an artificial-intelligence system is provided. The apparatus accesses images of a real-world scene and generates an image of a simulated object corresponding to a real-world object using a first generative adversarial network (GAN). The apparatus inserts the image of the simulated object into the images of the real-world scene to produce images of the real-world scene including the simulated object. The apparatus applies the images of the real-world scene including the simulated object to a second GAN to remove visual artifacts thereby producing a training set of images of the real-world scene including the simulated object. The apparatus trains an artificial-intelligence algorithm using the training set of images to build the artificial-intelligence system to detect the real-world object in further images of the real-world scene and outputs the artificial-intelligence system for deployment on an autonomous vehicle.

21 Claims, 5 Drawing Sheets

(56) References Cited

U.S. PATENT DOCUMENTS

2020/0012896 A1* 1/2020 Yoo ..................... G06K 9/6256
2020/0041276 A1* 2/2020 Chakravarty .......... G01C 21/32

OTHER PUBLICATIONS

J. Zhu, T. Park, P. Isola, A. Efros, "Unpaired Image-to-Image Translation using Cycle-Consistent Adversarial Networks," Cornell arXiv for Computer Vision and Pattern Recognition.
A. Creswell, T. White, V. Dumoulin, K. Arulkumaran, B. Sengupta, A.Bharath, "Generative Adversarial Networks: An Overview," Cornell arXiv for Computer Vision and Pattern Recognition.

* cited by examiner

BUILDING AN ARTIFICIAL-INTELLIGENCE SYSTEM FOR AN AUTONOMOUS VEHICLE

TECHNOLOGICAL FIELD

The present disclosure relates generally to building an artificial-intelligence system for an autonomous vehicle, and in particular, to building an artificial-intelligence system for an autonomous vehicle using generative adversarial networks.

BACKGROUND

An artificial-intelligence (AI) image processing system in autonomous vehicles can be used to identify the location, classification, form, and movement of external objects and obstacles. Training of the AI image processing system may require large volumes of accurately labeled training data. In many cases, labeling of the training data may require pixel-level accuracy. That is, individual pixels may need to be accurately labeled for training the AI image processing system. However, it may be difficult and expensive to manually label real-world data (e.g., videos and photographs) with pixel-level accuracy. Also, real-world data may not adequately cover all relevant training scenarios. Simulated images can provide large volumes of training data accurately labeled at the pixel-level. However, simulated images may introduce visual and/or textural artifacts such as distortions or inaccuracies due to the limitations of modeling reality via digital models.

Therefore, it would be desirable to have a system and method that takes into account at least some of the issues discussed above, as well as other possible issues.

BRIEF SUMMARY

Example implementations of the present disclosure are directed to building an artificial-intelligence (AI) system for an autonomous vehicle using generative adversarial networks. Example implementations use a first generative adversarial network (GAN) to generate an image of a simulated object corresponding to a real-world object. The first GAN can generate the image of the simulated object that is realistic (i.e., similar to an image of the real-world object). The image of the simulated object can be inserted into images of a real-world scene to produce images of the real-world scene including the simulated object. Inserting the image of the simulated object into images of real-world scene may cause artifacts. Example implementations can apply the images of the real-world scene including the simulated object to a second GAN to remove visual artifacts and produce a training set of images of the real-world scene including the simulated object. The training set of images of the real-world scene including the simulated object can be realistic (i.e., similar to images of the real-world scene including the real-world object with fewer if any visual artifacts). The training set of images can be used to train an AI algorithm to build the AI system to detect the real-world object in further images of the real-world scene.

Example implementations can provide multiple advantages over existing solutions. For example, the training set of images can provide large volumes of simulated but realistic training data, which can be used to supplement the limited volumes of real-world data to provide sufficient training data to train the AI system. Also, the training set of images can provide automatically and accurately labeled training data (e.g., with pixel-level accuracy) and reduce if not avoid the need to manually label real-world data. Moreover, the training set of images can adequately cover more relevant scenarios for training the AI system as compared to the real-world data, while the real-world data may cover limited scenarios.

The present disclosure thus includes, without limitation, the following example implementations.

Some example implementations provide a method of building an artificial-intelligence system, comprising: accessing images of a real-world scene; generating an image of a simulated object corresponding to a real-world object using a first generative adversarial network (GAN); inserting the image of the simulated object into the images of the real-world scene to produce images of the real-world scene including the simulated object; applying the images of the real-world scene including the simulated object to a second GAN to remove visual artifacts thereby producing a training set of images of the real-world scene that include the simulated object; training an artificial-intelligence algorithm using the training set of images to build the artificial-intelligence system to detect the real-world object in further images of the real-world scene; and outputting the artificial-intelligence system for deployment on an autonomous vehicle equipped with a camera configured to capture the further images, wherein the artificial-intelligence system is configured to detect the real-world object in the further images.

In some example implementations of the method of any preceding example implementation, or any combination of preceding example implementations, the method further comprises performing a semantic segmentation of the images to produce a mask of the real-world scene in the images, the mask including segments of pixels assigned to object classes for respective objects in the images of the real-world scene, and inserting the image of the simulated object into the images of the real-world scene includes inserting the image of the simulated object into at least one of the segments based on the object classes to which the segments are assigned.

In some example implementations of the method of any preceding example implementation, or any combination of preceding example implementations, the image of the simulated object is a first image, and the method further comprises: accessing a second image of the real-world object; and determining a pose of the real-world object in the second image, inserting the image of the simulated object into the images of the real-world scene further includes inserting the second image into the images of the real-world scene based on the pose of the real-world object in the second image to produce the images of the real-world scene including the simulated object and further including the real-world object.

In some example implementations of the method of any preceding example implementation, or any combination of preceding example implementations, applying the images of the real-world scene including the simulated object to the second GAN includes applying the images of the real-world scene including the simulated object and further including the real-world object to the second GAN.

In some example implementations of the method of any preceding example implementation, or any combination of preceding example implementations, the first GAN includes a first generative network and a first discriminative network, and generating the image includes using the first generative network to generate the image, and using the first discriminative network to evaluate the image based on a set of reference images of the real-world object.

In some example implementations of the method of any preceding example implementation, or any combination of preceding example implementations, the second GAN includes a second generative network and a second discriminative network, and producing the training set of images includes using the second generative network to produce the training set of images of the real-world scene including the simulated object, and using the second discriminative network to evaluate the training set of images based on a set of reference images of the real-world scene including the real-world object with fewer if any of the visual artifacts.

In some example implementations of the method of any preceding example implementation, or any combination of preceding example implementations, inserting the image of the simulated object into the images of the real-world scene includes at least: determining a pose of the real-world scene in the images, and inserting the image of the simulated object into the images of the real-world scene includes inserting the image of the simulated object into the images of the real-world scene based on the pose of the real-world scene in the images.

Some example implementations provide an apparatus for building an artificial-intelligence system. The apparatus comprises a processor and a memory storing executable instructions that, in response to execution by the processor, cause the apparatus to at least perform the method of any preceding example implementation, or any combination of any preceding example implementations.

Some example implementations provide a computer-readable storage medium for building an artificial-intelligence system. The computer-readable storage medium is non-transitory and has computer-readable program code stored therein that in response to execution by a processor, causes an apparatus to at least perform the method of any preceding example implementation, or any combination thereof.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
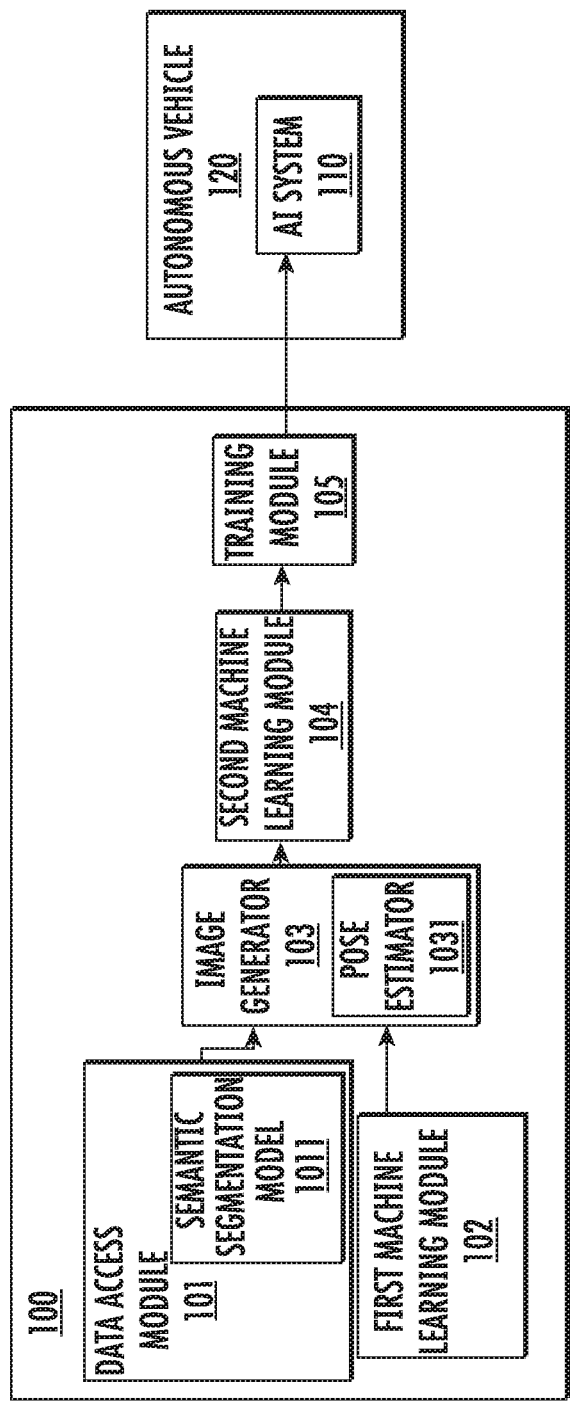
FIG. 1 illustrates a system for building an AI system, according to example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to building an artificial-intelligence system for an autonomous vehicle, and in particular, to building an artificial-intelligence system for an autonomous vehicle using generative adversarial networks. It should be understood that the system is applicable to any of a number of types of vehicles such as any of a number of different types of manned or unmanned land vehicles, aircraft, spacecraft, watercraft or the like.

FIG. 1 illustrates a system 100 for building an AI system 110, according to example implementations of the present disclosure. As shown, the AI system 110 can be deployed on an autonomous vehicle 120. In some examples, as described in greater detail with reference to FIG. 5, the system 100 may be implemented by an apparatus for building the AI system 110.

The system 100 includes any of a number of different subsystems (each an individual system) for performing one or more functions or operations. As shown, in some examples, the system 100 includes one or more of each of a data access module 101, a first machine learning module 102, an image generator 103, a second machine learning module 104 and a training module 105. The subsystems may be co-located or directly coupled to one another, or in some examples, various ones of the subsystems may communicate with one another across one or more computer networks. Further, although shown as part of the system, it should be understood that any one or more of the data access module 101, first machine learning module 102, image generator 103, second machine learning module 104 and training module 105 may function or operate as a separate system without regard to any of the other subsystems. It should also be understood that the system may include one or more additional or alternative subsystems than those shown in FIG. 1.

In some examples, the data access module 101 is configured to access images of a real-world scene such as images of a real-world street. The images of the real-world scene can be stored in a database such that the data access module 101 can access the images of the real-world scene from the database.

In some examples, the first machine learning module 102 is configured to generate an image of a simulated object corresponding to a real-world object using a first GAN. For example, the first machine learning module 102 may generate an image of a simulated tree corresponding to a real-world tree. In order to generate the image of the simulated object that is realistic (i.e., similar to an image of the real-world object), in some examples, the first machine learning module builds the first GAN that includes a first generative network and a first discriminative network. The first machine learning module 102 is configured to use the first generative network to generate the image of the simulated object. The first machine learning module 102 is also configured to use the first discriminative network to evaluate the image of the simulated object based on a set of reference images of the real-world object. The first machine learning module 102 will be described in greater detail with reference to FIG. 2 below.

In some examples, the image generator 103 is configured to insert the image of the simulated object into the images of the real-world scene to produce images of the real-world scene including the simulated object. For example, the image generator 103 can insert an image of a simulated tree into images of a real-world street to produce images of the real-world street including the simulated tree on the real-world street.

In order to insert the image of the simulated object into the images of the real-world scene properly, in some examples, the data access module 101 includes a semantic segmentation model 1011. The semantic segmentation model 1011 is configured to perform a semantic segmentation of the images of the real-world scene to produce a mask of the real-world scene in the images. The mask includes segments of pixels assigned to object classes for respective objects in the images of the real-world scene. For example, the mask may identify object classes including sidewalks, driveways and buildings in the images of the real-world street. The mask may include respective segments of pixels assigned to sidewalks, driveways and buildings in the images of the real-world street. In these examples, the image generator 103 is configured to insert the image of the simulated object into at least one of the segments based on the object classes to which the segments are assigned. For example, the image generator 103 can insert the image of the simulated tree into the segments assigned to sidewalks as commonly seen in reality, and may not insert the image of the simulated tree into the segments assigned to buildings as not commonly seen in reality. The semantic segmentation model may be separate from the data access module.

In some examples, the image generator 103 includes a pose estimator 1031 configured to determine a pose of the real-world scene in the images. In these examples, the image generator is configured to insert the image of the simulated object into the images of the real-world scene based on the pose of the real-world scene in the images. For example, the pose estimator 1031 can estimate or determine orientation of a scene surface such as street orientation of the real-world street in the images. The pose of the real-world scene can be used with the pose of the inserted simulated object to ensure that the orientation of the inserted simulated object at the inserted location in the images matches the orientation of the scene surface. The pose estimator 1031 may be separate from the image generator 103.

The image generator 103 can provide the produced images of the real-world scene including the simulated object to the second machine learning module 104. In some examples, the second machine learning module 104 is configured to apply the images of the real-world scene including the simulated object to a second GAN to remove visual artifacts thereby producing a training set of images of the real-world scene that include the simulated object. The artifacts may be caused by distortions or inaccuracies when inserting the image of the simulated object into the images of the real-world scene.

In order to remove the artifacts and produce the training set of images of the real-world scene including the simulated object, in some examples, the second machine learning module 104 builds the second GAN that includes a second generative network and a second discriminative network. The second machine learning module 104 is configured to use the second generative network to produce the training set of images of the real-world scene including the simulated object. The second machine learning module 104 is also configured to use the second discriminative network to evaluate the training set of images based on a set of reference images of the real-world scene including the real-world object with fewer if any of the visual artifacts. After the artifacts are removed, the training set of images of the real-world scene including the simulated object can be realistic (i.e., similar to images of the real-world scene including the real-world object with fewer if any visual artifacts).

When images of the real-world object are available, the system 100 can utilize the images of the real-world object combined with the image of the simulated object to produce images of the real-world scene including both the simulated object and the real-world object. In some examples, the image of the simulated object generated by the first machine learning module 102 is a first image, and the data access module 101 is configured to access a second image of the real-world object. For example, the data access module 101 can access an image of a real-world tree. The second image of the real-world object may be stored in a database. In these examples, the pose estimator 1031 is configured to determine a pose of the real-world object in the second image. For example, the pose estimator 1031 can estimate or determine the position and/or rotational orientation of the real-world tree. The image generator 103 is configured to insert the second image into the images of the real-world scene based on the pose of the real-world object in the second image. In this way, the image generator produces the images of the real-world scene including the simulated object and further including the real-world object. For example, the image generator can generate images of the real-world street including the simulated tree and the real-world tree.

When images of the real-world scene including both the simulated object and the real-world object are produced, in some examples, the second machine learning module 104 is configured to apply the images of the real-world scene including the simulated object and further including the real-world object to the second GAN to remove artifacts. The artifacts may be caused by distortions or inaccuracies when inserting the image of the simulated object and/or the image of the real-world object into the images of the real-world scene.

In some examples, the second machine learning module 104 can provide the training set of images of the real-world scene including the simulated object and/or the real-world object to the training module 105. In these examples, the training module is configured to train an artificial-intelligence algorithm using the training set of images to build the AI system 110 to detect the real-world object in further images of the real-world scene. For example, the training set of images may illustrate the real-world street including simulated but realistic trees and/or real-world trees at different locations. Based on the training set of images, the training module can build the AI system to be able to recognize or detect real-world trees at different locations on the real-world street.

In some examples, the training module 105 is also configured to output the AI system 110 for deployment on the autonomous vehicle 120. The autonomous vehicle is equipped with a camera configured to capture the further images. The AI system is configured to detect the real-world object in the further images. For example, the camera on the autonomous vehicle may capture further images of the real-world street including real-world trees at different locations. The AI system can detect the real-world trees at different locations on the real-world street in the further images. Based on the detection, the AI system can control the autonomous vehicle to avoid collision with the detected real-world trees.

Figure 2:
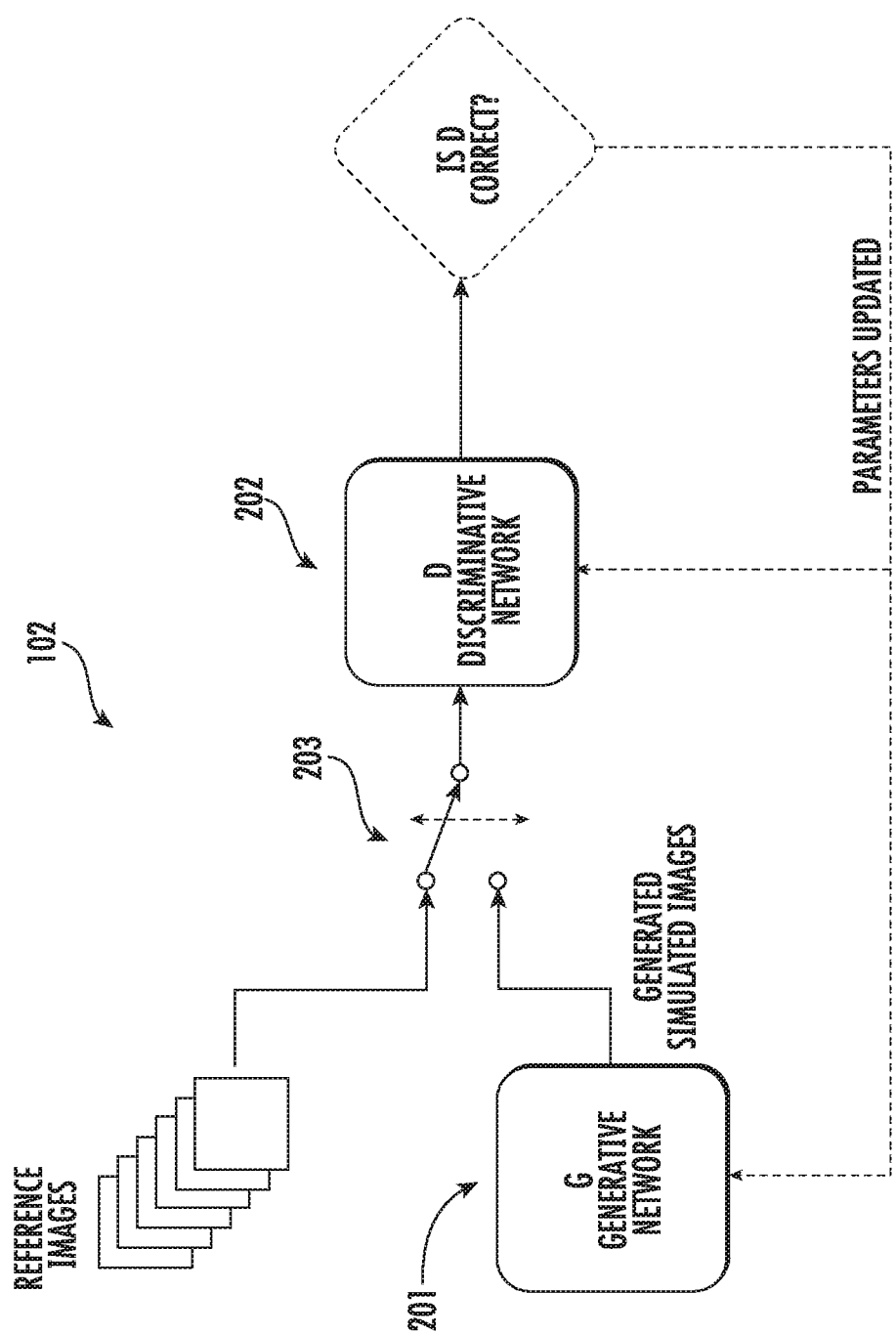
FIG. 2 illustrates a machine learning module, according to example implementations of the present disclosure.

FIG. 2 illustrates the first machine learning module 102, according to example implementations of the present disclosure. As shown, the first machine learning module includes a first GAN with a first generative network 201 and a first discriminative network 202. The first generative network 201 can generate simulated images including the simulated object. The first discriminative network 202 may alternatively receive a sample from a set of reference images of the real-world object and a sample from the simulated images through a switching component 203. The set of reference images may be stored in a database. After receiving a sample, the first discriminative network 202 may evaluate the sample and determine whether the sample is a sample from the set of reference images or a sample from the simulated images.

The first discriminative network 202 can make a decision as to whether a received sample is a sample from the set of reference images or a sample from the simulated images. The system 100 may have the information or knowledge of whether the first discriminative network 202 actually receives a sample from the set of reference images or from the simulated images. Thus, the system can determine whether the decision of the first discriminative network 202 is correct or not based on the information or knowledge. Based on the decision, the weights or parameters of the first discriminative network 202 and/or the generative network 201 can be tuned or updated.

As the machine learning process progresses, the first generative network 201 and first discriminative network 202 can converge to an equilibrium such as Nash equilibrium. At the equilibrium, the first generative network 201 can generate one or more images of the simulated object that mimics closely to the reference images, such that the first discriminative network 202 may not be able to distinguish the one or more images of the simulated object from the set of reference images of the real-world object. That is, the first generative network 201 can generate images of the simulated object that are realistic. In one example, the first discriminative network 202 can be used during the training process, e.g., in order to provide the first generative network 201 with training direction to train the first generative network 201 to become stronger and more accurate. The first discriminative network 202 may not be used during the actual application of the first generative network 201 (after the training process is complete).

Similarly, the second machine learning module 104 may include a second GAN with a second generative network and a second discriminative network. The second generative network can generate simulated images of the real-world scene including the simulated object and/or the real-world object. The generated simulated images may have artifacts as described above. The second discriminative network may alternatively receive a sample from a set of reference images and a sample from the simulated images. The set of reference images may include images of the real-world scene including the real-world object with fewer if any of the visual artifacts. After receiving a sample, the second discriminative network may evaluate the sample and determine whether the sample is a sample from the set of reference images or a sample from the simulated images. The second generative network and second discriminative network in the second machine learning module can converge to an equilibrium. At the equilibrium, the second generative network can generate one or more images of the real-world scene including the simulated object and/or the real-world object with fewer if any of the visual artifacts. The second discriminative network may not be able to distinguish the one or more images generated by the second generative network from the set of reference images. That is, the second generative network can generate images of the real-world scene including the simulated object and/or the real-world object that are realistic. In one example, the second discriminative network can be used during the training process to train the second generative network and may not be used during the actual application of the second generative network (after the training process is complete).

Figure 3:
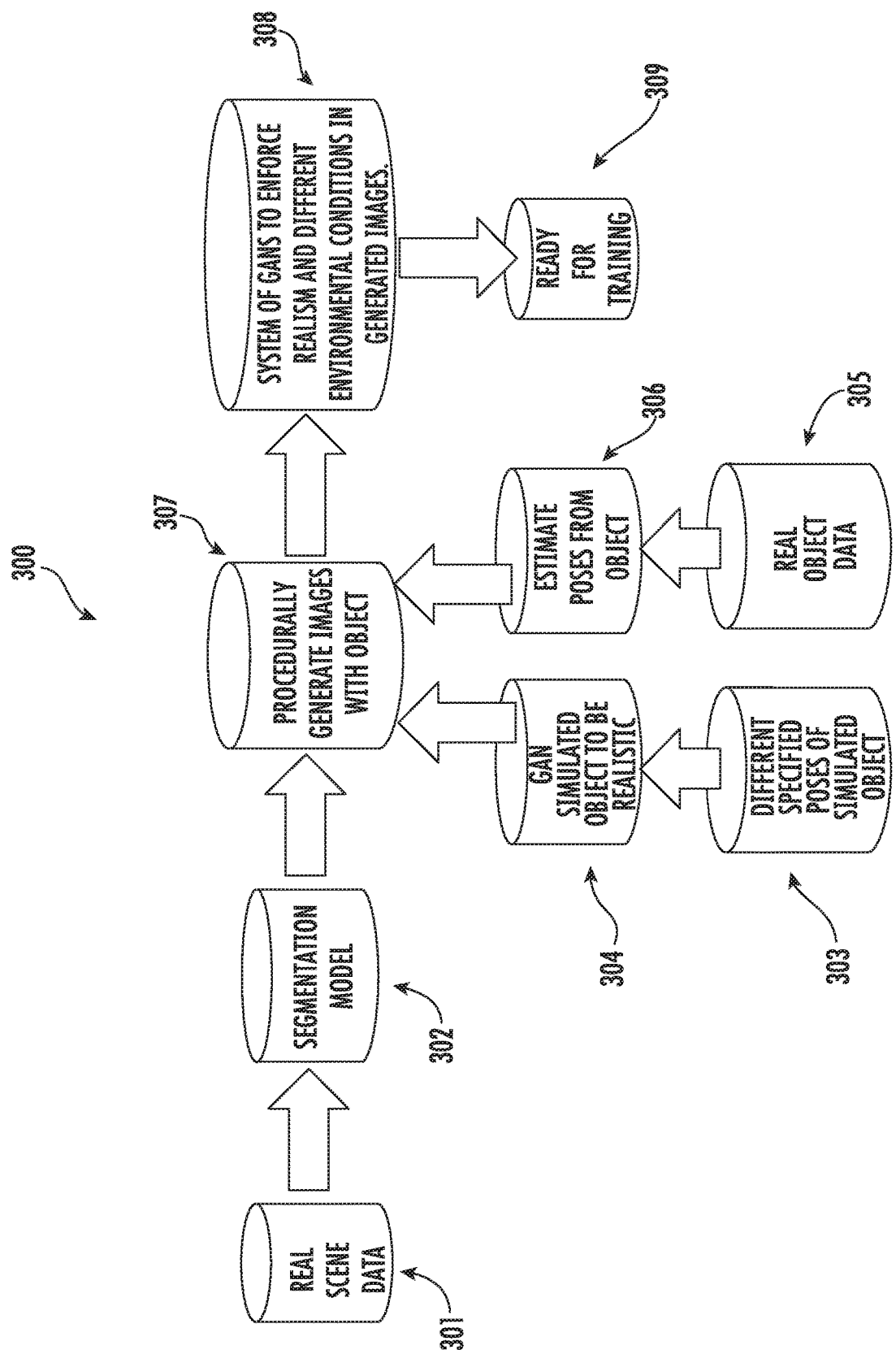
FIG. 3 illustrates a flow diagram of building an AI system, according to example implementations of the present disclosure.

FIG. 3 illustrates a flow diagram 300 of building an AI system, according to example implementations of the present disclosure. As shown, at block 301, the data access module 101 can access data of a real-world scene such as images of a real-world scene. Real-world data of the real-world scene may be limited. Thus, it would be desirable to generate simulated images of the real-world scene, so as to provide sufficient training data for the AI system 110.

At block 302, images of the real-world scene can be provided to the segmentation model 1011. The segmentation model can produce a semantically labeled mask for the real-world scene. The segmentation model can identify areas or objects-of-interest in the images. For example, the mask can indicate sidewalks in the images of a real-world street. After the areas or objects of interest are identified, the segmentation model can provide the images of the real-world scene to the image generator 103. The real-world scene may have different poses in different images. The poses of the real-world scene in the images can be estimated by the pose estimator 1031, as described above.

At block 303, the first machine learning module 102 can generate one or more images of a simulated object corresponding to a real-world object. The images of the simulated object may include different specified poses of the simulated object. In order to generate the images of the simulated object that are realistic, at block 304, the first machine learning module can use a first GAN to improve the realism of the images of the simulated object. That is, the machine learning module can use the first GAN to generate the images of the simulated object that mimic closely to a set of reference images of the real-world object, as described above. The first machine learning module can provide the simulated but realistic images of the simulated object to the image generator 103.

At block 305, the data access module 101 can access data of the real-world object such as images of the real-world object and provide the images of the real-world object to the image generator 103. The real-world object may have different poses in different images. At block 306, the poses of the real-world object in the images can be estimated by the pose estimator 1031, as described above.

At block 307, the image generator 103 can procedurally generate images of the real-world scene including the simulated object and the real-world object. The procedural generation of the real-world scene injects the real and simulated objects into the real-world scene based on the estimated pose of the real world scene. The objects injected may have photo-realistic poses based on the context of the real-world scene. Depending on the application, the image generator 103 can generate many images including different object classes or allowable object poses for one real-world scene.

Once the images of the real-world scene including the simulated object and the real-world object are generated by the image generator 103, at block 308, the second machine learning module 104 can use a second GAN to make the generated images photo realistic. The second machine learning module can enforce realism and different environmental conditions in the generated images. In one example, augmentations may be applied to each of the generated images to enforce realism and different environmental conditions. The second machine learning module can apply the augmentations in a specific order to ensure that the generated images are realistic with fewer if any artifacts. The realistic images of the real-world scene including the simulated object and the real-world object can be used as a training set of images of the real-world scene, as shown at block 309.

Figure 4:
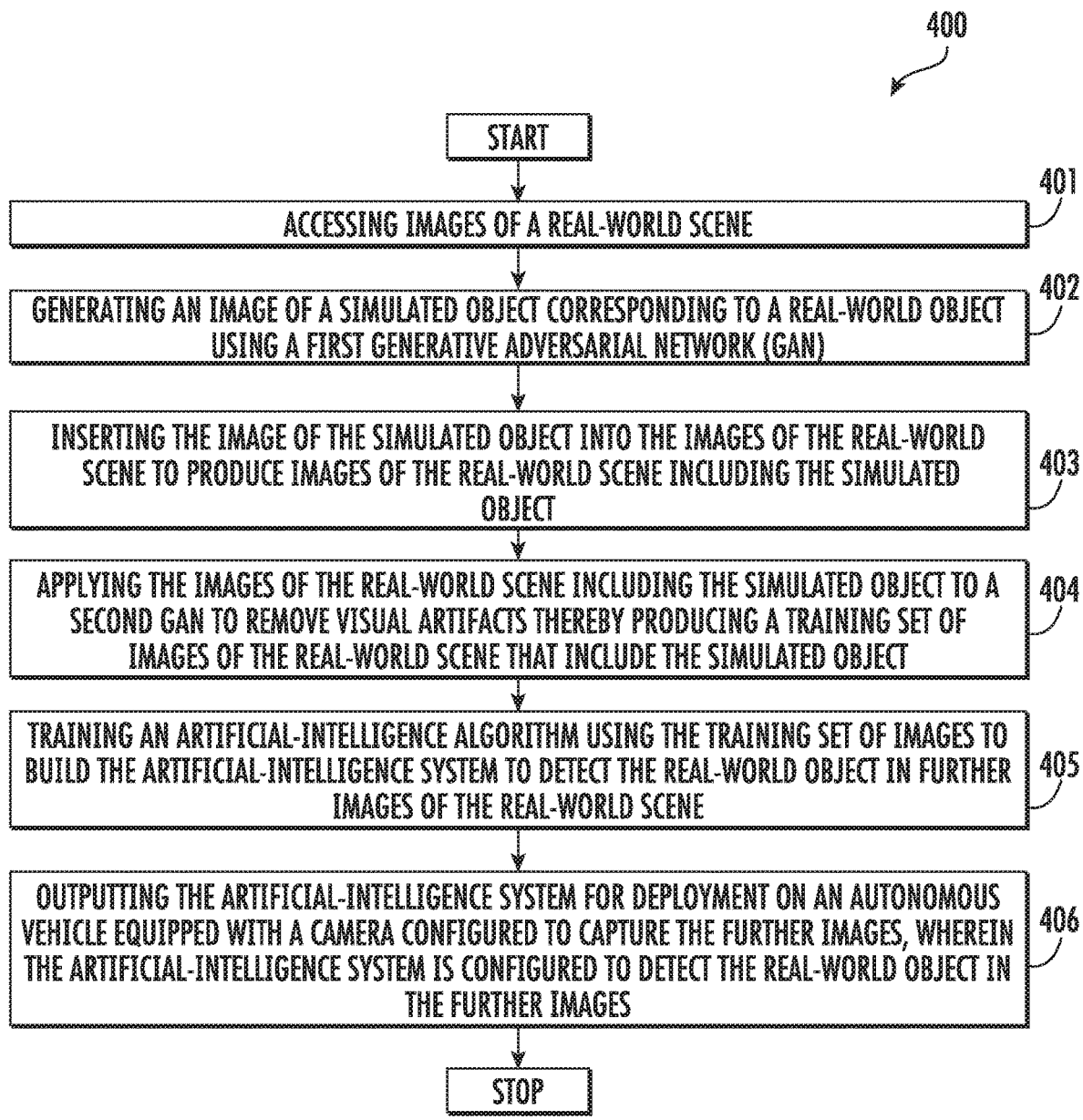
FIG. 4 is a flowchart illustrating various operations in a method of building an AI system, according to various example implementations.

FIG. 4 is a flowchart illustrating various operations in a method 400 of building an AI system 110, according to various example implementations. As shown at block 401, the method includes accessing images of a real-world scene. At block 402, the method includes generating an image of a simulated object corresponding to a real-world object using a first GAN. At block 403, the method includes inserting the image of the simulated object into the images of the real-world scene to produce images of the real-world scene including the simulated object.

At block 404, the method 400 includes applying the images of the real-world scene including the simulated object to a second GAN to remove visual artifacts, thereby producing a training set of images of the real-world scene that include the simulated object. At block 405, the method includes training an artificial-intelligence algorithm using the training set of images to build the artificial-intelligence system 110 to detect the real-world object in further images of the real-world scene. At block 406, the method includes outputting the artificial-intelligence system for deployment on an autonomous vehicle equipped with a camera configured to capture the further images, wherein the artificial-intelligence system is configured to detect the real-world object in the further images. Based on the detection of the real-world object, the AI system 110 can control operations of the autonomous vehicle for different purposes such as avoiding collision with the detected real-world object.

According to example implementations of the present disclosure, the system 100 and its subsystems including the data access module 101, first machine learning module 102, image generator 103, second machine learning module 104 and training module 105 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 5:
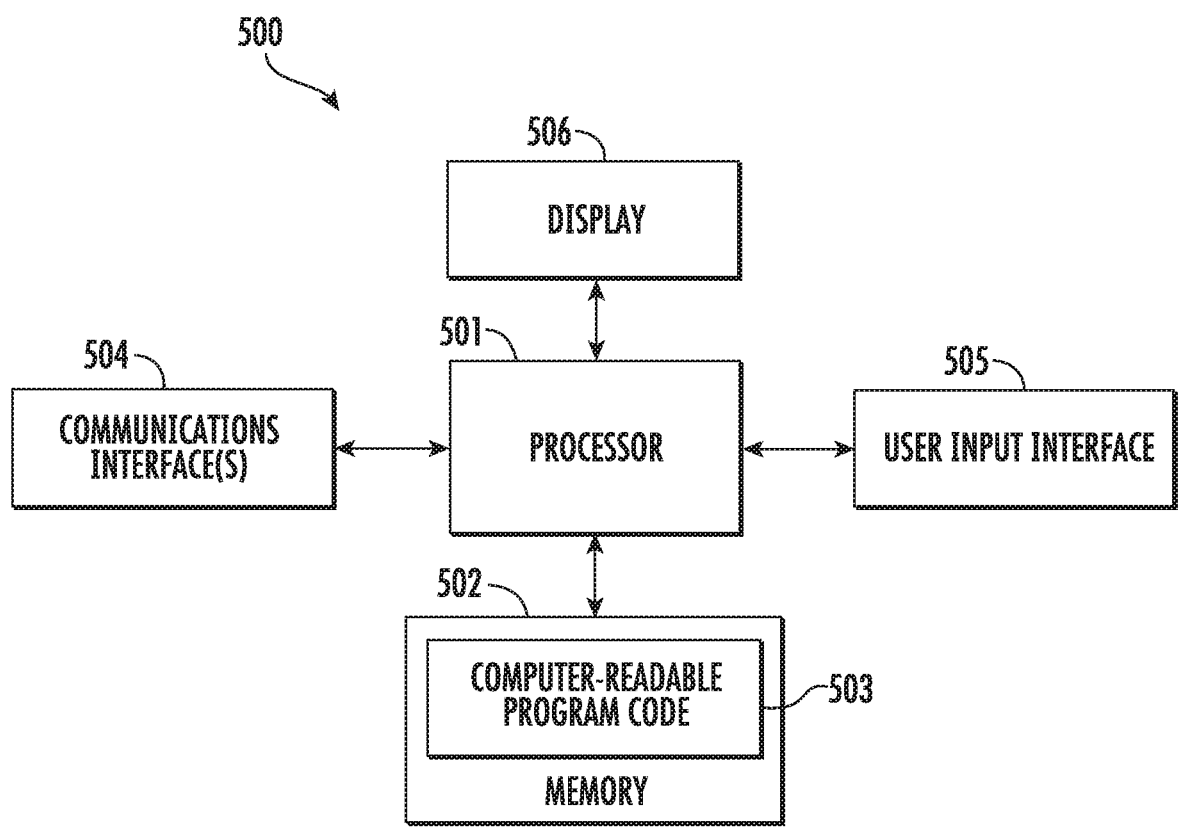
FIG. 5 illustrates an apparatus according to some example implementations.

FIG. 5 illustrates an apparatus 500 according to some example implementations. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 501 (e.g., processing circuitry) connected to a memory 502 (e.g., storage device). In some examples, the apparatus 500 implements the system 100.

The processor 501 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit, at times, is more commonly referred to as a "chip"). The processor may be configured to execute computer programs, which may be stored onboard the processor or otherwise stored in the memory 502 (of the same or another apparatus).

The processor 501 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 502 is generally any piece of computer hardware that is capable of storing information such as, for example, data, computer programs (e.g., computer-readable program code 503) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 502, the processor 501 may also be connected to one or more interfaces for displaying, transmitting and/or receiving information. The interfaces may include a communications interface 504 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 506 and/or one or more user input interfaces 505 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 500 may include a processor 501 and a computer-readable storage medium or memory 502 coupled to the processor, where the processor is configured to execute computer-readable program code 503 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for building an artificial-intelligence system, the apparatus comprising a processor and a memory storing executable instructions that, in response to execution by the processor, cause the apparatus to at least:
   access images of a real-world scene;
   generate an image of a simulated object corresponding to a real-world object using a first generative adversarial network (GAN);
   insert the image of the simulated object into the images of the real-world scene to produce images of the real-world scene including the simulated object;
   apply the images of the real-world scene including the simulated object to a second GAN to remove visual artifacts thereby producing a training set of images of the real-world scene that include the simulated object;
   train an artificial-intelligence algorithm using the training set of images to build the artificial-intelligence system to detect the real-world object in further images of the real-world scene; and
   output the artificial-intelligence system for deployment on an autonomous vehicle equipped with a camera configured to capture the further images, wherein the artificial-intelligence system is configured to detect the real-world object in the further images.

2. The apparatus of claim 1, wherein the memory stores further executable instructions that, in response to execution by the processor, cause the apparatus to further perform a semantic segmentation of the images to produce a mask of the real-world scene in the images, the mask including segments of pixels assigned to object classes for respective objects in the images of the real-world scene, and wherein the apparatus being caused to insert the image of the simulated object into the images of the real-world scene includes being caused to insert the image of the simulated object into at least one of the segments based on the object classes to which the segments are assigned.

3. The apparatus of claim 1, wherein the image of the simulated object is a first image, and the memory stores further executable instructions that, in response to execution by the processor, cause the apparatus to further at least:

access a second image of the real-world object; and determine a pose of the real-world object in the second image, wherein the apparatus being caused to insert the image of the simulated object into the images of the real-world scene in further includes being caused to insert the second image into the images of the real-world scene based on the pose of the real-world object in the second image to produce the images of the real-world scene including the simulated object and further including the real-world object.

4. The apparatus of claim 3, wherein the apparatus being caused to apply the images of the real-world scene including the simulated object to the second GAN includes being caused to apply the images of the real-world scene including the simulated object and further including the real-world object to the second GAN.

5. The apparatus of claim 1, wherein the first GAN includes a first generative network and a first discriminative network, and the apparatus being caused to generate the image includes being caused to use the first generative network to generate the image, and use the first discriminative network to evaluate the image based on a set of reference images of the real-world object.

6. The apparatus of claim 1, wherein the second GAN includes a second generative network and a second discriminative network, and the apparatus being caused to produce the training set of images incudes being caused to use the second generative network to produce the training set of images of the real-world scene including the simulated object, and use the second discriminative network to evaluate the training set of images based on a set of reference images of the real-world scene including the real-world object with fewer if any of the visual artifacts.

7. The apparatus of claim 1, wherein the apparatus being caused to insert the image of the simulated object into the images of the real-world scene includes at least:

determine a pose of the real-world scene in the images, and wherein the apparatus being caused to insert the image of the simulated object into the images of the real-world scene includes being caused to insert the image of the simulated object into the images of the real-world scene based on the pose of the real-world scene in the images.

8. A method of building an artificial-intelligence system, comprising:

accessing images of a real-world scene;

generating an image of a simulated object corresponding to a real-world object using a first generative adversarial network (GAN);

inserting the image of the simulated object into the images of the real-world scene to produce images of the real-world scene including the simulated object;

applying the images of the real-world scene including the simulated object to a second GAN to remove visual artifacts thereby producing a training set of images of the real-world scene that include the simulated object;

training an artificial-intelligence algorithm using the training set of images to build the artificial-intelligence system to detect the real-world object in further images of the real-world scene; and outputting the artificial-intelligence system for deployment on an autonomous vehicle equipped with a camera configured to capture the further images, wherein the artificial-intelligence system is configured to detect the real-world object in the further images.

9. The method of claim 8, further comprising performing a semantic segmentation of the images to produce a mask of the real-world scene in the images, the mask including segments of pixels assigned to object classes for respective objects in the images of the real-world scene, and wherein inserting the image of the simulated object into the images of the real-world scene includes inserting the image of the simulated object into at least one of the segments based on the object classes to which the segments are assigned.

10. The method of claim 8, wherein the image of the simulated object is a first image, and the method further comprises:

accessing a second image of the real-world object; and determining a pose of the real-world object in the second image, wherein inserting the image of the simulated object into the images of the real-world scene further includes inserting the second image into the images of the real-world scene based on the pose of the real-world object in the second image to produce the images of the real-world scene including the simulated object and further including the real-world object.

11. The method of claim 10, wherein applying the images of the real-world scene including the simulated object to the second GAN includes applying the images of the real-world scene including the simulated object and further including the real-world object to the second GAN.

12. The method of claim 8, wherein the first GAN includes a first generative network and a first discriminative network, and generating the image includes using the first generative network to generate the image, and using the first discriminative network to evaluate the image based on a set of reference images of the real-world object.

13. The method of claim 8, wherein the second GAN includes a second generative network and a second discriminative network, and producing the training set of images incudes using the second generative network to produce the training set of images of the real-world scene including the simulated object, and using the second discriminative network to evaluate the training set of images based on a set of reference images of the real-world scene including the real-world object with fewer if any of the visual artifacts.

14. The method of claim 8, wherein inserting the image of the simulated object into the images of the real-world scene includes at least:

determining a pose of the real-world scene in the images, and wherein inserting the image of the simulated object into the images of the real-world scene includes inserting the image of the simulated object into the images of the real-world scene based on the pose of the real-world scene in the images.

15. A computer-readable storage medium for building an artificial-intelligence system, the computer-readable storage medium being non-transitory and having computer-readable program code stored therein that in response to execution by a processor, causes an apparatus to at least:
   access images of a real-world scene;
   generate an image of a simulated object corresponding to a real-world object using a first generative adversarial network (GAN);
   insert the image of the simulated object into the images of the real-world scene to produce images of the real-world scene including the simulated object;
   apply the images of the real-world scene including the simulated object to a second GAN to remove visual artifacts thereby producing a training set of images of the real-world scene that include the simulated object;
   train an artificial-intelligence algorithm using the training set of images to build the artificial-intelligence system to detect the real-world object in further images of the real-world scene; and
   output the artificial-intelligence system for deployment on an autonomous vehicle equipped with a camera configured to capture the further images, wherein the artificial-intelligence system is configured to detect the real-world object in the further images.

16. The computer-readable storage medium of claim 15, having further computer-readable program code stored therein that in response to execution by the processor, causes the apparatus to further perform a semantic segmentation of the images to produce a mask of the real-world scene in the images, the mask including segments of pixels assigned to object classes for respective objects in the images of the real-world scene, and
   wherein the apparatus being caused to insert the image of the simulated object into the images of the real-world scene includes being caused to insert the image of the simulated object into at least one of the segments based on the object classes to which the segments are assigned.

17. The computer-readable storage medium of claim 15, wherein the image of the simulated object is a first image, and the computer-readable storage medium has further computer-readable program code stored therein that in response to execution by the processor, causes the apparatus to further at least:
   access a second image of the real-world object; and
   determine a pose of the real-world object in the second image,
   wherein the apparatus being caused to insert the image of the simulated object into the images of the real-world scene further includes being caused to insert the second image into the images of the real-world scene based on the pose of the real-world object in the second image to produce the images of the real-world scene including the simulated object and further including the real-world object.

18. The computer-readable storage medium of claim 17, wherein the apparatus being caused to apply the images of the real-world scene including the simulated object to the second GAN includes being caused to apply the images of the real-world scene including the simulated object and further including the real-world object to the second GAN.

19. The computer-readable storage medium of claim 15, wherein the first GAN includes a first generative network and a first discriminative network, and the apparatus being caused to generate the image includes being caused to use the first generative network to generate the image, and use the first discriminative network to evaluate the image based on a set of reference images of the real-world object.

20. The computer-readable storage medium of claim 15, wherein the second GAN includes a second generative network and a second discriminative network, and the apparatus being caused to produce the training set of images incudes being caused to use the second generative network to produce the training set of images of the real-world scene including the simulated object, and use the second discriminative network to evaluate the training set of images based on a set of reference images of the real-world scene including the real-world object with fewer if any of the visual artifacts.

21. The computer-readable storage medium of claim 15, wherein the apparatus being caused to insert the image of the simulated object into the images of the real-world scene includes at least:
   determine a pose of the real-world scene in the images, and
   wherein the apparatus being caused to insert the image of the simulated object into the images of the real-world scene includes being caused to insert the image of the simulated object into the images of the real-world scene based on the pose of the real-world scene in the images.

* * * * *